Jan. 5, 1954

W. E. BROWN 2,664,687

COTTON STRIPPER WITH MOVING COMB

Filed Oct. 13, 1950

INVENTOR.

William E. Brown
by Victor J. Evans & Co.

ATTORNEYS

UNITED STATES PATENT OFFICE 2,664,687

COTTON STRIPPER WITH MOVING COMB

William E. Brown, Roaring Springs, Tex.

Application October 13, 1950, Serial No. 189,993

2 Claims. (Cl. 56—35)

This invention relates to cotton strippers of cotton picking and stripping machines, and in particular a screw or spiral positioned to coact with spaced fingers wherein with the fingers traveling through cotton plants the spiral stripping elements glean or strip remaining bolls or parts thereof from the plants.

This application is a continuation in part of my co-pending application with the Serial Number 759,606, which has matured into Patent No. 2,526,535, and includes particularly the spiral rotating elements positioned at the lower end of the chute or conveyor and mounted to strip cotton from cotton plants as the device is conveyed over a field of cotton.

The purpose of this invention is to eliminate the necessity of sending cotton pickers back into a field to strip cotton remaining on plants from the plants.

It is customary, particularly after cotton is picked by conventional types of cotton pickers, to send laborers back into the field to strip the cotton plants of cotton remaining thereon. With this thought in mind this invention contemplates passing a plurality of spaced fingers with spiral rotating elements mounted above and positioned to coact with the fingers through the remaining cotton plants whereby the plants are thoroughly raked and substantially all cotton remaining thereon is removed.

The object of this invention is, therefore, to provide means for constructing a stripping element so that as cotton plants are subjected to the elements all cotton remaining on the plants is stripped therefrom.

Another object of the invention is to provide rotating spiral cotton stripping elements that are positioned to coact with spaced parallel fingers in which the fingers are adjustably mounted in relation to the spiral elements.

A further object of the invention is to provide an improved cotton stripping element which is of a comparatively simple and economical construction.

With these and other objects and advantages in view the invention embodies a spiral element having right and left hand threads thereon or having tines positioned in right and left hand spirals and means for journaling the elements in the walls of a chute having a conveyor in the lower part thereof and having arcuate fingers adjustably mounted therein and extended forwardly therefrom.

Other features and advantages of the invention will appear from the following description taken in connection with the drawings wherein.

Figure 4:
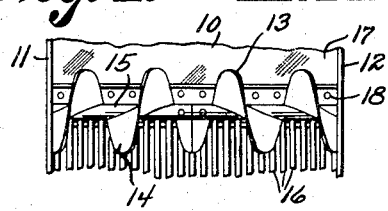
Figure 4 is a fragmentary detail view on a reduced scale illustrating the spiral stripping element as illustrated in the co-pending application and which is the subject of this invention.

Referring now to the drawings wherein like reference characters denote corresponding parts. The cotton stripping device of this invention includes a chute 10 having side walls 11 and 12. Spiral vanes 13 and 14 are mounted on a shaft 15 which, as illustrated in Figure 4, is journaled in the side walls 11 and 12.

The chute is also provided with spaced parallel fingers 16 which extend forwardly from the under surface of the spiral element, and a conveyor 17 with slats 18 thereon that carries cotton upwardly from the spiral stripping element through the chute.

With the parts mounted in this manner the device is actuated with the fingers 16 traveling forwardly through cotton plants in a field and as the plants pass into the fingers the spiral vanes of the rotating element grip the plants between the peripheral edges of the vanes and the fingers 16 whereby all of the cotton remaining on the plants is stripped therefrom.

Figure 1:
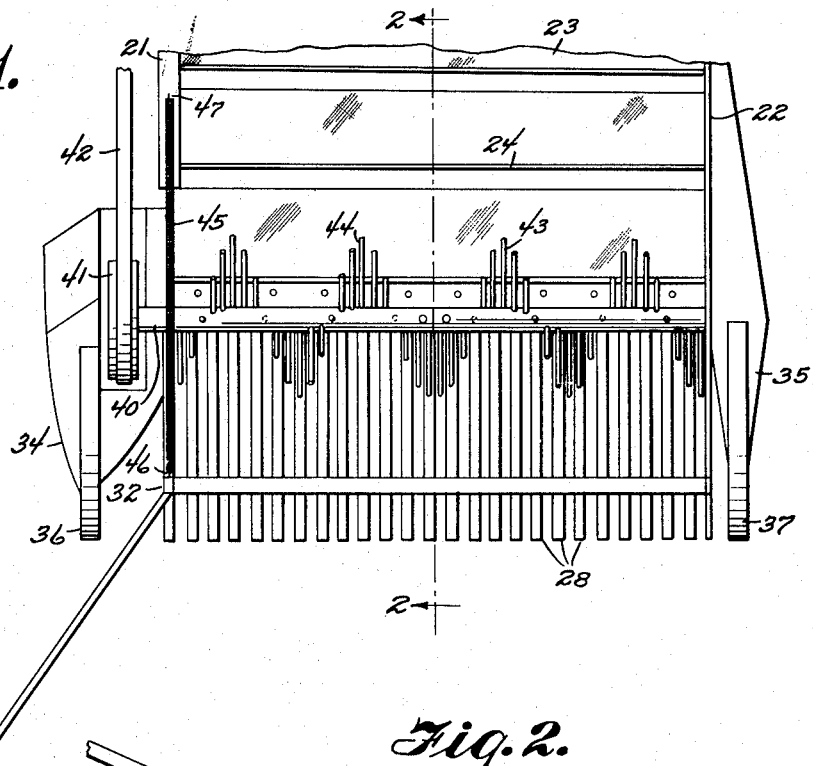
Figure 1 is a plan view showing the lower end of the chute of a cotton picking or stripping device with a spiral gripping element journaled in the chute in which the spiral stripping element is of a modified design.
Figure 2:
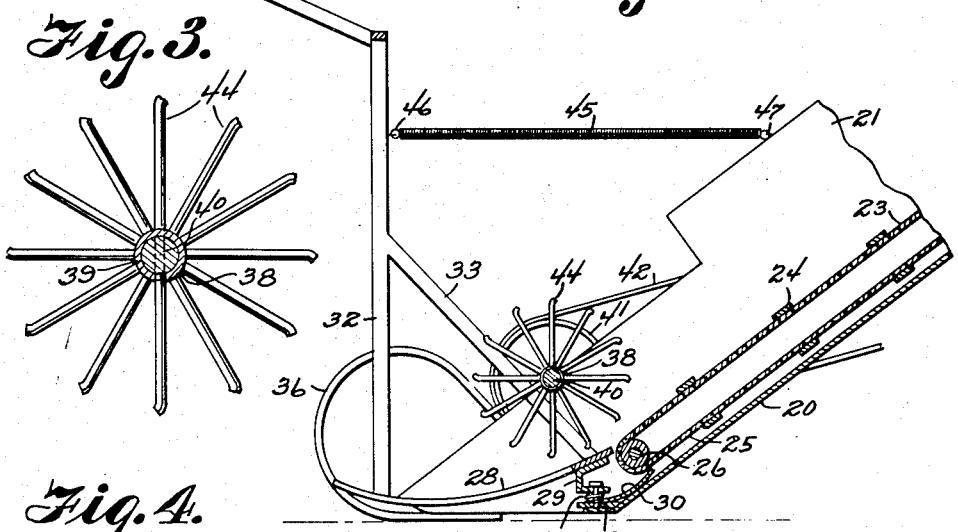
Figure 2 is a cross section through the lower end of the chute taken on line 2—2 of Figure 1 and also showing the modified spiral stripping element.
Figure 3:
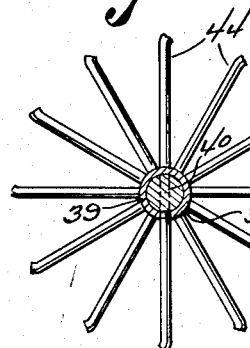
Figure 3 is a detail on an enlarged scale showing a section through the modified spiral gripping element.

In the design shown in Figures 1, 2 and 3 the chute 20 which is provided with side walls 21 and 22, is provided with a conveyor 23 having slats 24 thereon and the lower end of the conveyor is mounted on a roller 25 on a shaft 26.

The lower end of the chute 20 is provided with a flange 27 on which the inner ends of spaced parallel fingers 28 are mounted through a channel shaped member 29, a mounting plate 30, and springs 31 which resiliently urge the inner ends of the fingers upwardly so that the outer ends are urged downwardly.

The lower end of the chute is also supported by brackets 32 at the sides and the brackets are provided with arms 33 which extend inwardly as shown in Figure 2.

The lower end of the chute 20 is provided with shoes 34 and 35, the forward ends of which are supported by guards 36 and 37, as shown in Figures 1 and 2.

In the design illustrated in Figures 1, 2 and 3 the spiral stripping element is formed with a tube 38 on a sleeve 39, which is journaled in the sides 21 and 22 by a shaft 40 and one end of the shaft 40 is provided with a pulley 41 by which the stripping element is rotated by means of a belt 42. The shaft 40 is rotatably mounted on the sleeve 39, and suitable ball bearings may be provided for mounting the sleeve 39 in the sides 21 and 22. The stripping element is provided with tines 43 on one side, and 44 on the other and, as illustrated in Figure 1 the tines 43 are positioned in a right hand spiral whereas the tines 44 are positioned in a left hand spiral. The tines are provided with arcuate outer ends as shown.

The supporting means of the fingers 28 is resiliently urged upwardly by a spring 45 which is attached to the bracket 32 by an eye 46 and to the side plates 21 by an eye 47.

With the parts arranged in this manner the cotton stripper of this invention is conveyed through a field of cotton with the plants passing between the fingers 28 whereby the upper parts thereof are gripped by the spiral elements 13 and 14, or 43 and 44 and with the spiral elements coacting with the upper surfaces of the fingers 28 substantially all cotton remaining on the plants is raked or scraped therefrom. The cotton stripped from the plants in this manner is conveyed by the conveyor 24 upwardly through the chute 20.

It will be understood that other modifications may be made in the design and arrangement of the parts without departing from the spirit of the invention.

What is claimed is:

1. In a cotton stripper, the combination which comprises an inclined chute, conveying means in the chute, substantially horizontally disposed parallel fingers extended forwardly from the leading lower end of the chute, a transversely disposed channel member extended across the chute and upon which the said fingers are mounted, resilient means mounting the said channel member and fingers in the lower leading end of the chute, a shaft journaled in the chute and extended transversely across the lower part thereof radially disposed tines carried by the shaft and positioned with the tips of the tines spaced from the upper surfaces of the fingers whereby the tines coact with the fingers for removing cotton from cotton plants extended between the fingers.

2. In a cotton stripper, the combination which comprises an inclined chute, conveying means in said chute, substantially horizontally disposed spaced parallel fingers extended forwardly from the leading lower end of the chute, a transversely disposed channel member extended across the chute and upon which the said fingers are mounted, resilient means mounting the said channel member and fingers in the lower leading end of the chute, a shaft journaled in the chute and extended transversely across the lower part thereof, a spiral having tines positioned to represent right and left hand threads thereon positioned with the tips of the tines spaced from the upper surfaces of the fingers whereby the tines coact with the fingers for removing cotton from cotton plants extended between the fingers.

WILLIAM E. BROWN.

References Cited in the file of this patent

UNITED STATES PATENTS

| Number | Name | Date |
|---|---|---|
| 1,065,695 | Little | June 24, 1913 |
| 1,576,904 | Francis | Mar. 16, 1926 |
| 1,760,312 | Mitchell | May 27 1930 |
| 2,517,063 | Wallace | Aug. 1, 1950 |
| 2,557,475 | Schieman | June 19, 1951 |